United States Patent
Murakami et al.

(10) Patent No.: US 6,785,403 B1
(45) Date of Patent: Aug. 31, 2004

(54) METHOD AND SYSTEM FOR INSPECTING A VEHICLE-MOUNTED CAMERA

(75) Inventors: Keiichi Murakami, Tokyo-To (JP); Noriyuki Miyazawa, Tokyo-To (JP)

(73) Assignee: Fuji Jukogyo Kabushiki Kaisha, Tokyo-to (JP)

( * ) Notice: Subject to any disclaimer, the term of this patent is extended or adjusted under 35 U.S.C. 154(b) by 531 days.

(21) Appl. No.: 09/665,949

(22) Filed: Sep. 21, 2000

(30) Foreign Application Priority Data

Sep. 22, 1999 (JP) .......................... 11-269572

(51) Int. Cl.[7] ................................................ G06K 9/00
(52) U.S. Cl. .................... 382/104; 382/106; 382/153; 340/436; 340/901; 348/95; 348/118; 348/188; 348/373; 701/300; 396/428
(58) Field of Search ................................ 382/104, 106, 382/151, 153; 340/436, 437, 901–905; 348/95, 113, 118, 180, 188, 373–376; 701/200, 300, 301; 396/419, 428

(56) References Cited

U.S. PATENT DOCUMENTS

| | | | |
|---|---|---|---|
| 3,882,268 A | | 5/1975 | Ogawa et al. |
| 4,609,939 A | | 9/1986 | Kozawa et al. |
| 4,746,977 A | | 5/1988 | White |
| 4,899,189 A | | 2/1990 | Frost |
| 5,555,555 A | * | 9/1996 | Sato et al. .................. 382/104 |
| 5,768,443 A | | 6/1998 | Michael et al. |
| 5,850,254 A | * | 12/1998 | Takano et al. .............. 348/148 |
| 5,931,252 A | * | 8/1999 | Shimizu et al. ............. 180/204 |
| 6,067,147 A | * | 5/2000 | Hirabayashi et al. ....... 356/3.14 |

FOREIGN PATENT DOCUMENTS

| | | |
|---|---|---|
| DE | 198 00 354 | 7/1998 |
| EP | 0 691 599 | 1/1996 |
| FR | 2 609 068 | 7/1988 |
| WO | WO 90/12922 | 11/1990 |
| WO | WO 92/19811 | 11/1992 |

OTHER PUBLICATIONS

European Search Report for corresponding European appln. No. EP 00 12 0177 dated Aug. 30, 2001.

* cited by examiner

*Primary Examiner*—Amelia M. Au
*Assistant Examiner*—Chong Kim

(57) ABSTRACT

An optical axis direction, a distance measurement accuracy and so on are efficiently performed for quality assurance of a vehicle-mounted camera in cooperation of an image processing unit and a vehicle-mounted navigation control unit. In a vehicle monitoring system for imaging view ahead of the vehicle with the camera (2a, 2b) installed in the vehicle body and for recognizing a running condition with the image processing unit (20), the image processing unit measures an optical axis direction and a distance measurement accuracy to determine whether the camera quality is appropriate or not for quality assurance of the vehicle-mounted camera. The determined result is displayed on a monitor (52) of the vehicle mounted navigation control unit (5) to recommend adjustment of the camera. When failure is determined in the pass/fail determination of the optical axis direction, an attachment member having a shape, the optical axis direction by which is included in the correct range in the reference pattern of the recognized image, is selected from a variety of the attachment members prepared in advance, and replacement of the attachment member with the selected attachment member is recommended.

5 Claims, 13 Drawing Sheets

FIG.6 A

SCREEN 1-0 : VISUAL CHECK FOR CAMERA

VISUAL CHECK OF RIGHT-CAMERA IMAGE

PUSH "EXECUTION BUTTON" TO SWITCH TO
A RIGHT-CAMERA IMAGE FOR CHECKING.
IF IT IS OK, PUSH "EXECUTION" AGAIN TO SWITCH
LEFT-CAMERA IMAGE.

FIG.6 B

SCREEN 2-0 : VISUAL CHECK FOR LEFT CAMERA

VISUAL CHECK OF LEFT-CAMERA IMAGE

PUSH "EXECUTION BUTTON" TO SWITCH TO
A LEFT-CAMERA IMAGE FOR CHECKING.
IF IT IS OK, PUSH "EXECUTION" AGAIN TO START
OPTICAL AXIS MEASUREMENT.

FIG.6 C

SCREEN 3-0 : OPTICAL AXIS INSPECTION OK

OPTICAL AXIS OK

PUSH "EXECUTION BUTTON"
TO START DISTANCE IMAGE
MEASUREMENT.

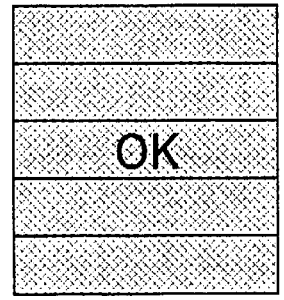

SCREEN 4-1: OPTICAL AXIS INSPECTION NG
(INSTRUCTION TO USE ADJUSTER A)

FIG. 7 A

NG: CAMERA ANGLE IS DOWNWARD.
USE ADJUSTER A.

PUSH "EXECUTION BUTTON" TO START OPTICAL AXIS MEASUREMENT.

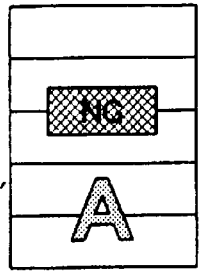

SCREEN 4-2: OPTICAL AXIS INSPECTION NG
(INSTRUCTION TO USE ADJUSTER D)

FIG. 7 B

NG: CAMERA ANGLE IS DOWNWARD.
USE ADJUSTER D.

PUSH "EXECUTION BUTTON" TO START OPTICAL AXIS MEASUREMENT.

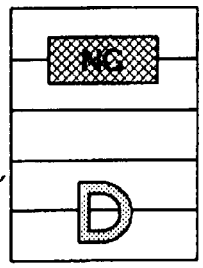

SCREEN 4-3: OPTICAL AXIS INSPECTION NG
(INSTRUCTION TO USE ADJUSTER C)

FIG. 7 C

NG: CAMERA ANGLE IS UPWARD.
USE ADJUSTER C.

PUSH "EXECUTION BUTTON" TO START OPTICAL AXIS MEASUREMENT.

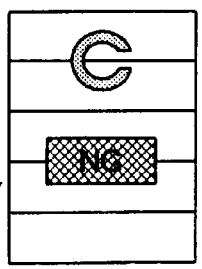

SCREEN 4-4: OPTICAL AXIS INSPECTION NG
(INSTRUCTION TO USE ADJUSTER E)

FIG. 7 D

NG: CAMERA ANGLE IS UPWARD.
USE ADJUSTER E.

PUSH "EXECUTION BUTTON" TO START OPTICAL AXIS MEASUREMENT.

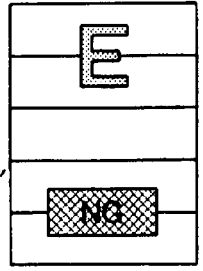

FIG.8 A
SCREEN 5-0: DISTANCE INSPECTION OK

INSPECTION OK

DISTANCE OK

ALL ITEMS HAVE PASSED INSPECTION.

PUSH "EXECUTION BUTTON" TO GO BACK TO ORIGINAL SCREEN.

FIG.8 B
SCREEN 6-0: DISTANCE INSPECTION NG

NG

CHECK TROUBLE CODE BEFORE RE-ADJUSTMENT.

FIG.8 C
SCREEN 9-0: PROCESSING

PROCESSING

NAVIGATION SCREEN 2-0
A=2, B=0

NAVIGATION SCREEN 4-3
A=4, B=3

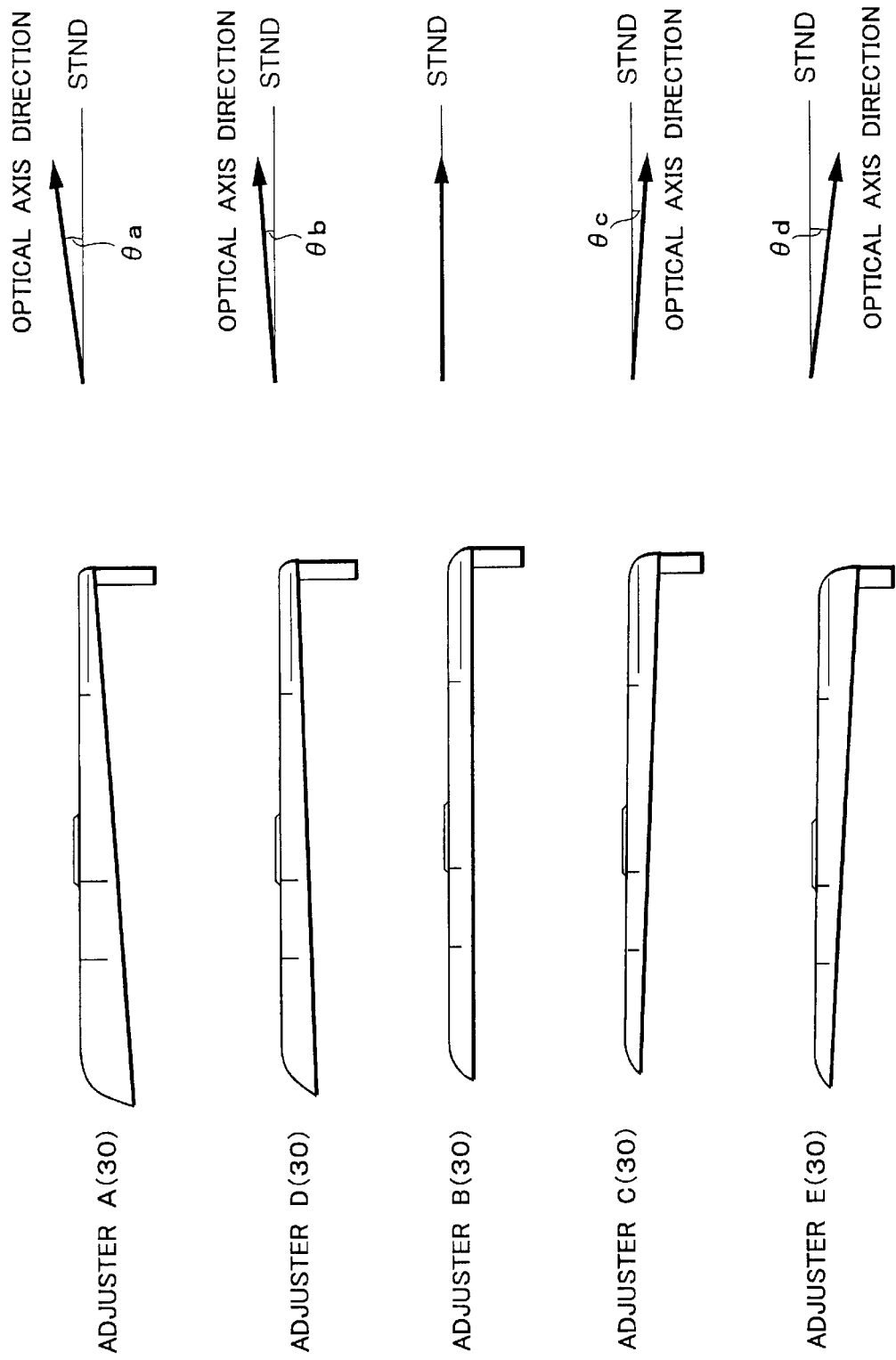

METHOD AND SYSTEM FOR INSPECTING A VEHICLE-MOUNTED CAMERA

BACKGROUND OF THE INVENTION

1. Field of the Invention

The invention relates to a method for inspecting cameras mounted on vehicles such as an automobile, and systems for the same.

2. Description of the Related Art

Recent years, the spotlight has been centered on vehicle-driving monitoring systems using a monocular camera or a stereo camera as a preview sensor. Such a monitoring system uses a vehicle-mounted camera to image the views ahead of a vehicle and then executes an image recognition based on the imaged screen for the vehicle driving control such as in calling attention to the driver and in shifting to lower gear for deceleration.

Using the stereo camera as the preview sensor, pinpoint accuracy is needed for an installation position of the stereo camera to the vehicle as well as the quality of the stereo camera itself. The displacing of the installation position of the camera causes a shift of the imaging direction, resulting in deterioration in the reliability of the monitor control. Particularly, since in the stereo scheme, a distance is computed from parallax produced between a pair of imaged frames, the shift of the imaging direction directly exerts an influence upon the computed distance. Under present circumstances, however, the angle of individual vehicle-mounted camera is varied due to the limitations associated with deformation of the car body itself or the accuracy of installing the camera. In such shifting of the imaging direction, the image frames undergo an image transformation process, such as the affine transformation, to be finely adjusted with equivalence.

However, since a finely adjustable range by the image transformation is small in actual fact, the imaging directions of the vehicle-mounted camera may shift significantly from the range, resulting in the difficulties of the fine adjustment by the image transformation.

For this reason, it is needed to check whether or not the imaging directions of the installed camera fall within the correct range, through an inspection process performed after the camera is installed to the vehicle. If there are the cameras determined in the inspection process that the imaging directions sift from the correct range, they must undergo some mechanical re-adjustment, e.g. the re-installation of the camera, so that their imaging directions fall within the correct range. This requires a large-scale and expensive inspection apparatus and a lot of time and effort. There has been a desire to establish a test method for achieving efficiently the automation of such an inspection.

SUMMARY OF THE INVENTION

The present invention has been made in consideration of the aforementioned circumstances. It is therefore an object of the present invention to provide a method and a system for efficiently inspecting a vehicle-mounted camera, with eliminating the need for using a conventional inspection apparatus and with employing cooperation of an image processing unit and a vehicle-mounted navigation control unit to determine the camera quality through the inspections of an optical axis direction, a distance measurement accuracy and so on, i.e. whether or not they are in correct ranges, and then to display the determined results on a monitor of the vehicle-mounted navigation control unit for recommending adjustment.

To attain the object, a method for inspecting a vehicle-mounted camera according to the present invention is used for a vehicle monitoring system for imaging the view ahead of a vehicle with the camera installed to a vehicle body to recognize a running condition with an image processing unit, and includes the steps of inspecting the camera with the image processing unit to determine whether or not the camera quality is appropriate and displaying the inspected result on a monitor of a vehicle-mounted navigation control unit.

Further, the inspecting step for the quality assurance of the camera includes the steps of imaging an inspection chart, described with a reference pattern and placed at a predetermined position ahead of the vehicle, with the camera installed to the vehicle body, identifying a reference pattern on the camera image, and determining pass/fail of an optical axis direction of the camera on the basis of the relationship between a position of the identified reference pattern and a predetermined correct range defined for an imaging direction of the camera. In this event, the vehicle-mounted camera is attached through a replaceable attachment member to the vehicle body and has the imaging direction defined by a shape of the attachment member. Therefore, when the optical axis direction is determined to fail in the pass/fail determining step, another attachment member having a shape, optical axis direction by which is included in the correct range in the reference pattern of the recognized image, is selected from a plurality of pre-prepared attachment members of varying shapes. Replacement of the attachment member with the selected attachment member is recommended.

Furthermore, the inspecting step for the quality assurance of the camera includes the steps of imaging a plate described with a specific pattern and placed at a predetermined position ahead of the vehicle with the camera installed to the vehicle body, to calculate a distance image until the plate ahead of the vehicle with the image processing unit, and determining pass/fail of a distance measurement accuracy of the camera on a basis of comparison between the calculated distance image and a predetermined correct distance image characteristic.

Therefore, the present invention is for performing the inspection of at least the optical axis direction and the distance measurement accuracy for quality assurance of the vehicle-mounted camera to determine whether the camera quality is appropriate or not, and displaying the results on the monitor of the vehicle-mounted navigation control unit. For this reason, since the inspections for quality assurance relating to the visual check, the optical axis direction, the distance measurement accuracy and so on for the vehicle-mounted camera can be performed using the monitor of the vehicle-mounted navigation control unit, it is possible to eliminate the need for using any extra apparatus for the inspection processes, and also to reduce a working space for smoothly performing the inspections, resulting in significant efficiency of the inspection processes. Moreover, when the shifting of the imaging direction of the inspected camera is recognized, the information of the degree of shifting including the selection information for the replacement adjuster is provided to the operator for adjustment, resulting in efficiency of the re-adjusting process.

In addition, a system for inspecting a vehicle-mounted camera according to the present invention is used for a vehicle monitoring system for imaging the view ahead of a vehicle with a camera installed to the vehicle body to recognize a running condition with an image processing unit, and includes inspection means provided in the image processing unit for quality assurance of the camera and for determining whether the camera quality is appropriate or not, and display means of a vehicle-mounted navigation control unit for displaying the determined result. The image processing unit includes a recognition main unit and a quality inspection section as the inspection means, and the quality inspection section designates at least one of an optical axis direction and a distance measurement accuracy as inspection items to determine pass/fail of the designated measurement, and assigns information of selecting a displayed screen defined for each inspection item into a communication data so as to transmit it to the navigation control unit. Moreover, the system for inspecting the vehicle-mounted camera further includes switch means for starting the inspection means to execute the inspection for the quality assurance of the camera, and instructing the switching of a displayed screen defined for each inspection item.

According to the present invention, since the monitor for the vehicle-mounted navigation unit can be used to inspect for quality assurance relating to the visual check, the optical axis direction, the distance measurement accuracy and so on for the vehicle-mounted camera, any extra apparatus is not needed for the inspection processes but the inspection is smoothly performed in the reduced working space. This allows the significant efficiency of the inspection processes.

These and other objects and advantages of the present invention will become obvious to those skilled in the art upon review of the following description, the accompanying drawings and appended claims.

BRIEF DESCRIPTION OF THE DRAWINGS

FIGS. 6A to 6C illustrate screen layouts displayed on a monitor of NCU.

FIGS. 7A to 7D illustrate screen layouts displayed on the monitor of NCU.

FIGS. 8A to 8C illustrate screen layouts displayed on the monitor of NCU.

FIG. 14 is a view showing varieties of an attachment member (adjuster) which is independent of the stereo camera assembly used in the present invention.

DETAILED DESCRIPTION OF THE PREFERRED EMBODIMENT

Figure 1:
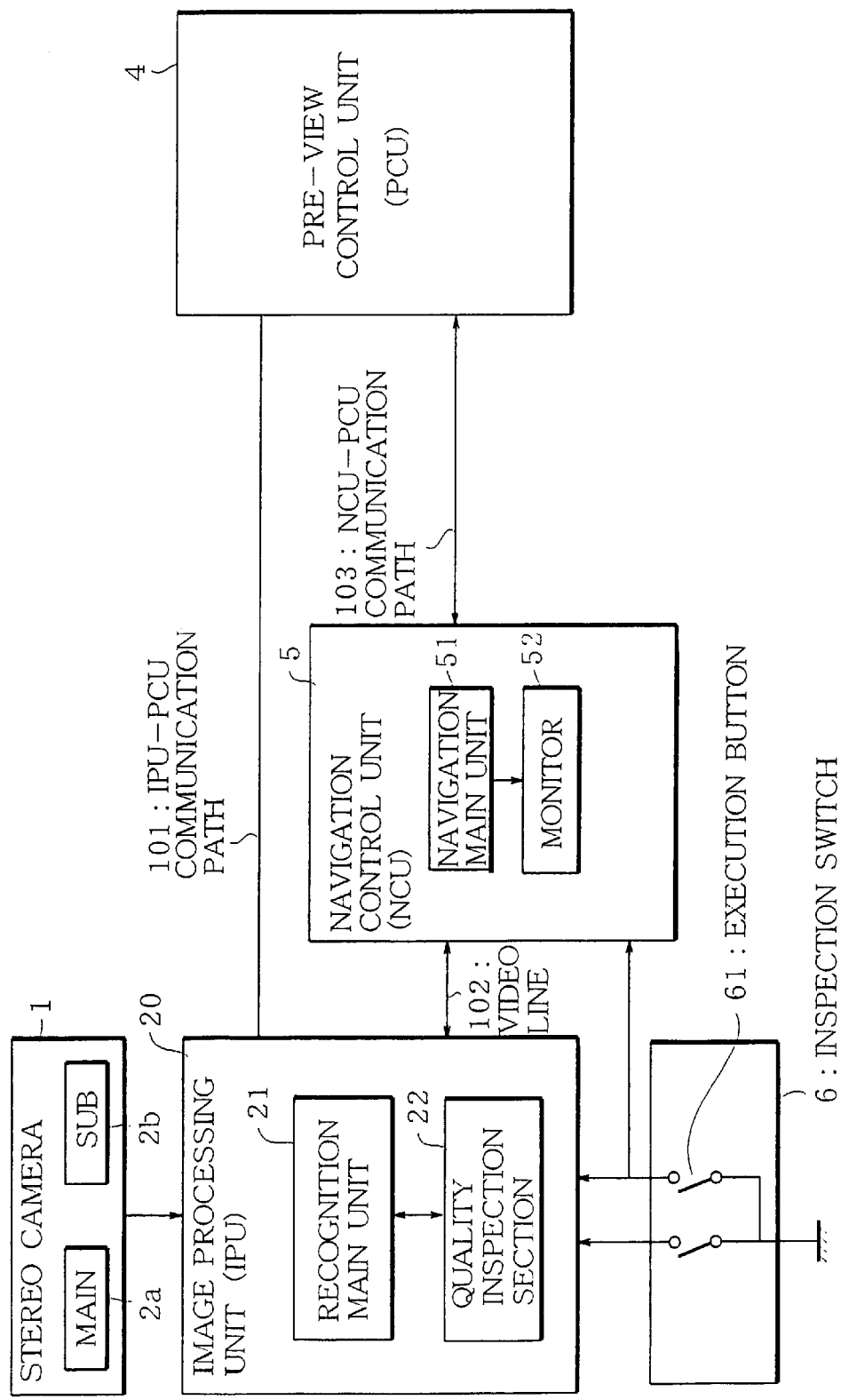
FIG. 1 is a block diagram showing an embodiment according to the present invention.

FIG. 1 is a block diagram illustrating an embodiment according to the present invention. In the drawing, a stereo camera is used as an example of the vehicle-mounted camera. The stereo camera 1 for imaging running conditions ahead of a vehicle, has a camera 2a as a main camera and a camera 2b as a sub camera in pair which are disposed having a predetermined base line length. The installation of the stereo camera 1 to a car body is linked up with an inspecting method of the camera, so that it will be first explained in brief with reference to FIGS. 11 to 14.

Figure 11:
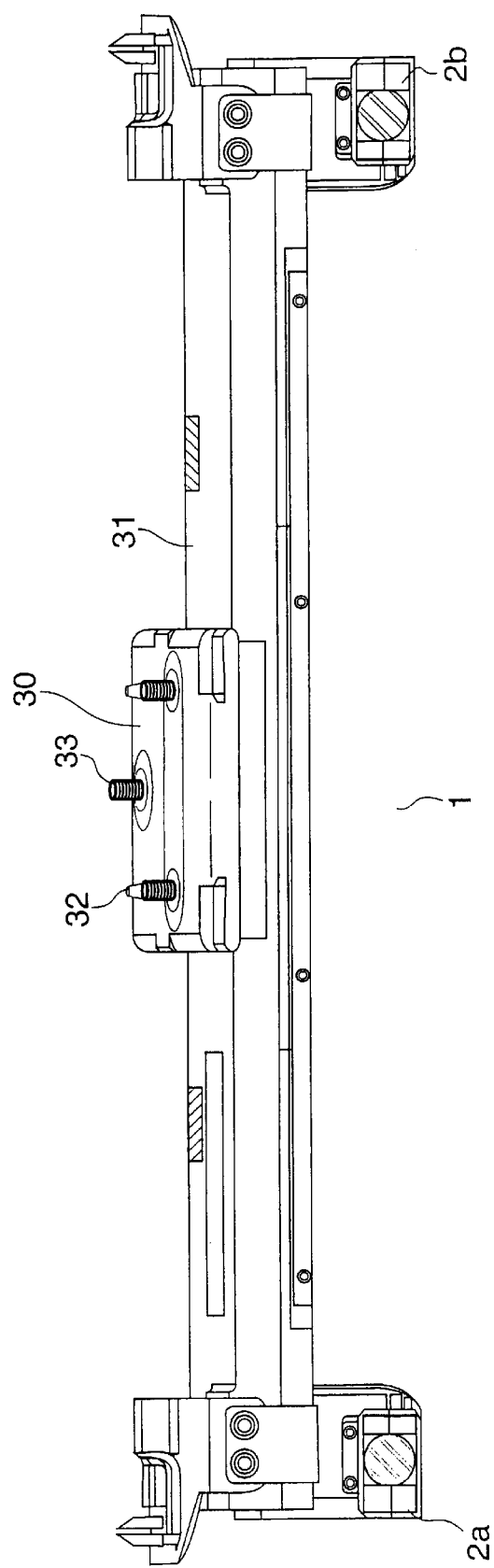
FIG. 11 is a front view of a stereo camera 1 used in the present invention.
Figure 12:
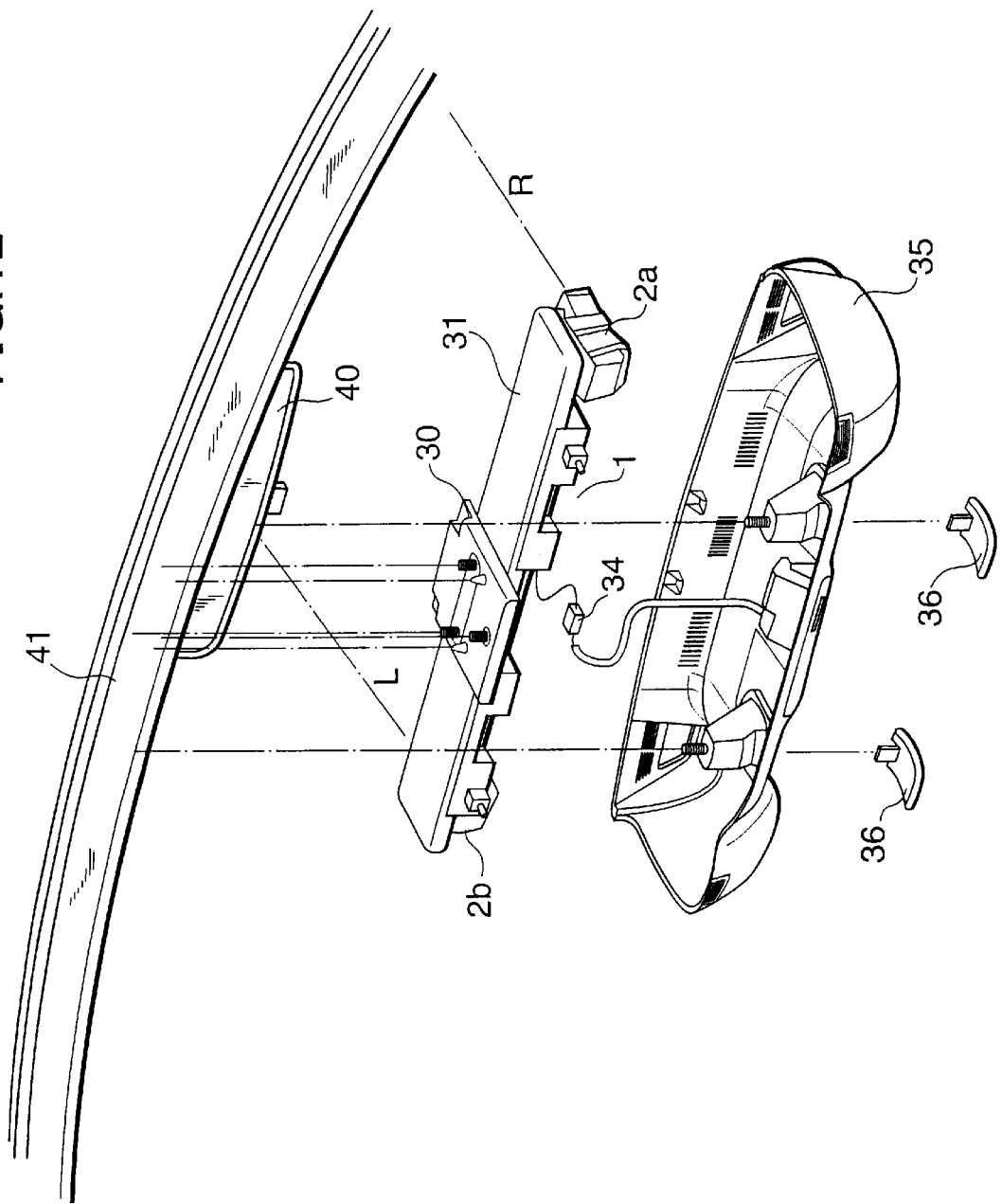
FIG. 12 is an exploded view of an installation structure of the stereo camera 1 used in the present invention.
Figure 13:
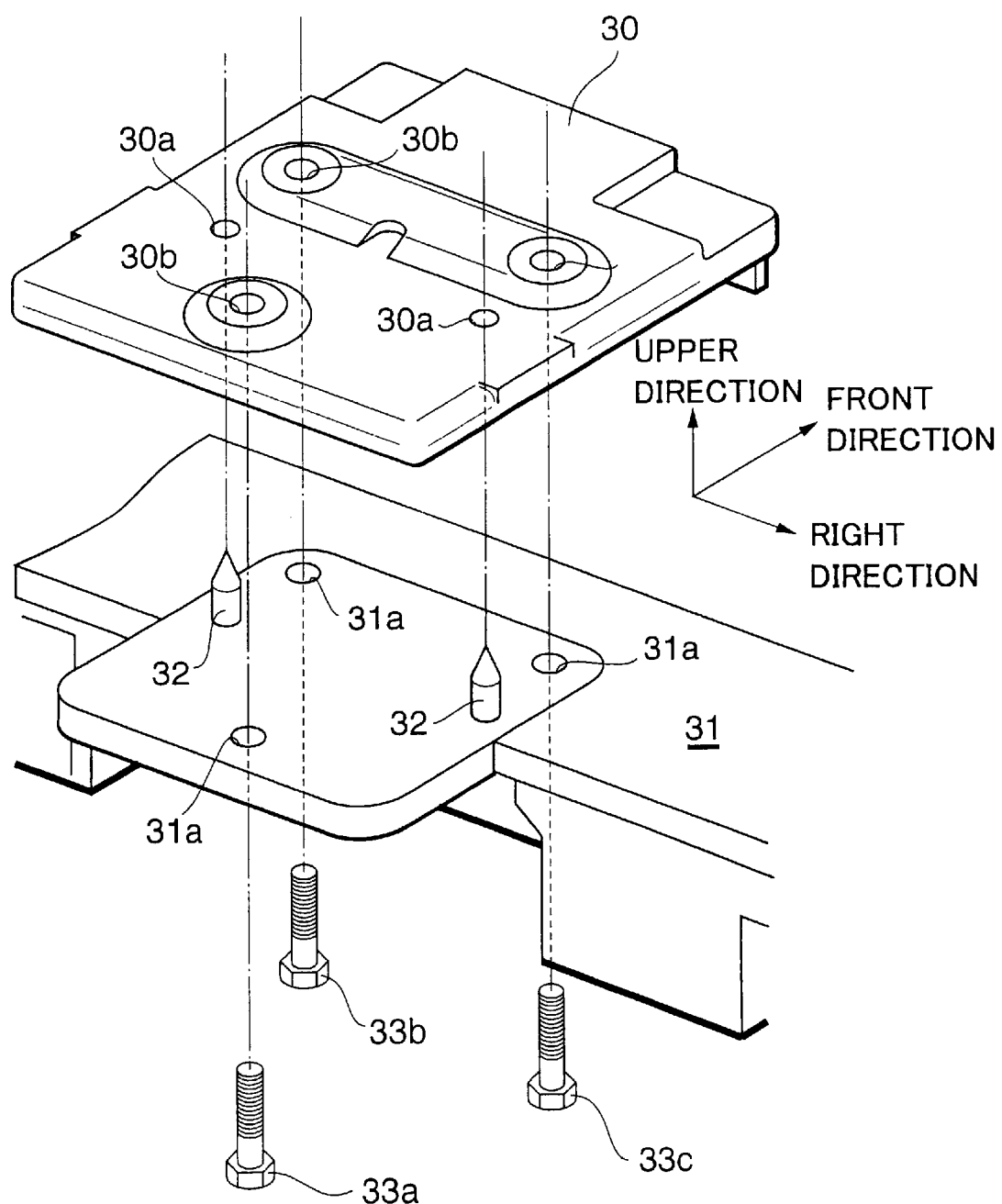
FIG. 13 is an enlargedly exploded view of part of an installing portion of the stereo camera 1 used in the present invention.

FIG. 11 is a front view of the stereo camera 1, FIG. 12 is an exploded view of the entire installation structure of the stereo camera 1, FIG. 13 is an exploded view of a main part of an installing portion of the stereo camera 1, and FIG. 14 show varieties of an attachment member (adjuster) which is independent of the stereo camera assembly.

A chassis 31 of the stereo camera 1 is made of an aluminum alloy having high stiffness not to be deformed by the weight of cameras 2a, 2b or changes in speed of the running vehicle. The main camera 2a is installed at the right end of the chassis 31 facing the forward direction of the vehicle. The camera 2a incorporates an image sensor such as CCD, and a reference image is produced under an output signal from the image sensor. The sub camera 2b is installed at the left end of the chassis 31, and an output signal from the camera 2b is used for producing a comparison image. In the central portion of the chassis 31, three installing holes (for bolts 33) are formed to pass between the upper face and the lower face of the chassis 31. And also two locator pin 32 are formed for positioning the stereo camera 1 when being installed to the car body (a front rail 41).

The stereo camera 1 (i.e., the stereo camera assembly 1 including the cameras 2a, 2b) is mounted around a rearview mirror 40 on the car body (the front rail 41 in the embodiment) using an adjuster 30 as an attachment member. After this installation, the adjuster 30 having a predetermined plate-thickness is interposed between the stereo camera assembly 1 and the front rail 41. In the installation process of stereo camera 1, the locator pins 32 formed on the chassis 31 are first inserted in respective positioning through-holes 30a formed on the adjuster 30. In this state, the position of the three installing holes 31a formed on the chassis 31 are respectively aligned with the three installing holes 30b formed on the adjuster 30.

Next, the locator pins 32 are respectively inserted in holes formed on the front rail 41. While in this state, subsequently, the three bolts 33a, 33b and 33c are respectively inserted in the three aligned through-holes 31a and 30b, to secure the stereo camera 1 onto the front rail 41. Then, after a switch connector 34 is connected to the stereo camera assembly 1, an outer cover 35 is fastened to the front rail 41 with bolts. And then, escutcheon plates 36 are respectively fitted into parts of the outer cover 35 where the bolts have been inserted, to make the appearance neat, and a sequence of installation operation is completed.

The aforementioned attachment adjuster 30 is a member separated from the stereo camera assembly 1 or the chassis 31. Therefore, the adjuster 30 can be handled independently whenever being detached from the stereo camera assembly 1. As explained above, the stereo camera assembly 1 is installed to the front rail 41 with the adjuster 30 in between. Using the independent attachment member from the camera body in the installation allows the attachment member to be replaced to make rough adjustment for the imaging direction of the stereo camera 1. This point is significantly distinct from the conventional approaches in which a stay integrated with a camera assembly is directly installed to a car body. Specifically, a sectional form of the adjuster 30 in the longitudinal direction of the vehicle is designed to define vertical components of the imaging direction of the stereo camera 1, i.e. the optical axis L and R of the camera illustrated in FIG. 12. More specifically, if the adjuster 30 is gradually changed so that its plate-thickness increases from the rear portion (on the left side of FIG. 13) toward the front portion (on the right side) as illustrated with adjuster C in FIG. 14, then the imaging direction of the stereo camera 1 will adjust downward, or toward the ground, in proportion to the increased thickness. On the other hand, using the plate-thickness of the adjuster 30 gradually increased from the front portion toward the rear portion, as illustrated with adjuster A in FIG. 14, the thicker the plate-thickness of the rear portion, the more upward the stereo camera 1 is oriented.

As explained above, the adjuster 30 can be removed from the stereo camera assembly 1 and handled independently. The imaging direction of the stereo camera 1 is therefore adjusted by replacing a current adjuster 30 with another adjuster 30 having a different form as required. For example, in the installation process of the stereo camera 1, a standard adjuster 30 having a certain form is commonly used to install the stereo camera assembly 1 to the car body. In the inspection process following the installation process, if it is determined that the imaging direction of the installed stereo camera 1 shifts significantly from a correct range (a range of deviation fine-adjustable through the image transformation), the standard adjuster 30 is replaced with a replacement adjuster. Various replacement adjusters are available as illustrated in FIG. 14, each of which is slightly different in form from one another (e.g. the degree and a direction of increasing the thickness). Thus, an adjuster having a proper form is used to adjust the variations of the imaging direction, resulting from accuracy in mechanical processes or deformation of the car body and the like, to within the correct range.

An image signal outputted from the stereo camera 1 thus installed to the car body is processed by blocks positioned at the back as follows while the cameras 2a and 2b are in synchronization with each other, the image signals outputted from the cameras 2a and 2b are applied to an image processing unit (hereinafter call IPU) 20. The IPU 20 is composed of a recognition main unit 21 and a quality inspection section 22. The recognition main unit 21 is provided for converting the image signal applied from the stereo camera 1 into a digital signal and for processing the image based on the signal. The quality inspection section 22 receives a startup request from an inspection switch 6 as described later, and then performs the inspection in cooperation with the recognition main unit 21, following the procedure shown in the flow charts of FIGS. 2 and 3.

A pre-view control unit (hereinafter call PCU) 4 serves as a control pivot of a vehicle monitoring system, which is connected to the IPU 20 through a communication cable (IPU-PCU communication path) 101. The PCU 4 and the IPU 20 exchange data with each other through the communication cable 101 in serial, to perform a variety of controls for monitoring the vehicle. A navigation control unit (hereinafter call NCU) 5 is composed of a navigation main unit 51 and a monitor 52 such as a liquid crystal display, and is connected to the IPU 20 through a video line 102 and to the PCU 4 through a communication cable (NCU-PCU communication path) 103.

The inspection switch 6 is a simple switch used by an operator only when the quality of the camera is inspected. Upon connection of a connector of the IPU 20 by the operator, inspection mode is automatically set (GND state), and the quality inspection section 22 of the IPU 20 starts a software inspection routine. ON or OFF of an execution button 61 incorporated in the inspection switch 6 is set to maintain the GND state or an OPEN state, and to instruct the switching of the screen on the monitor 52 included in the NCU 5, and the like.

Figure 2:
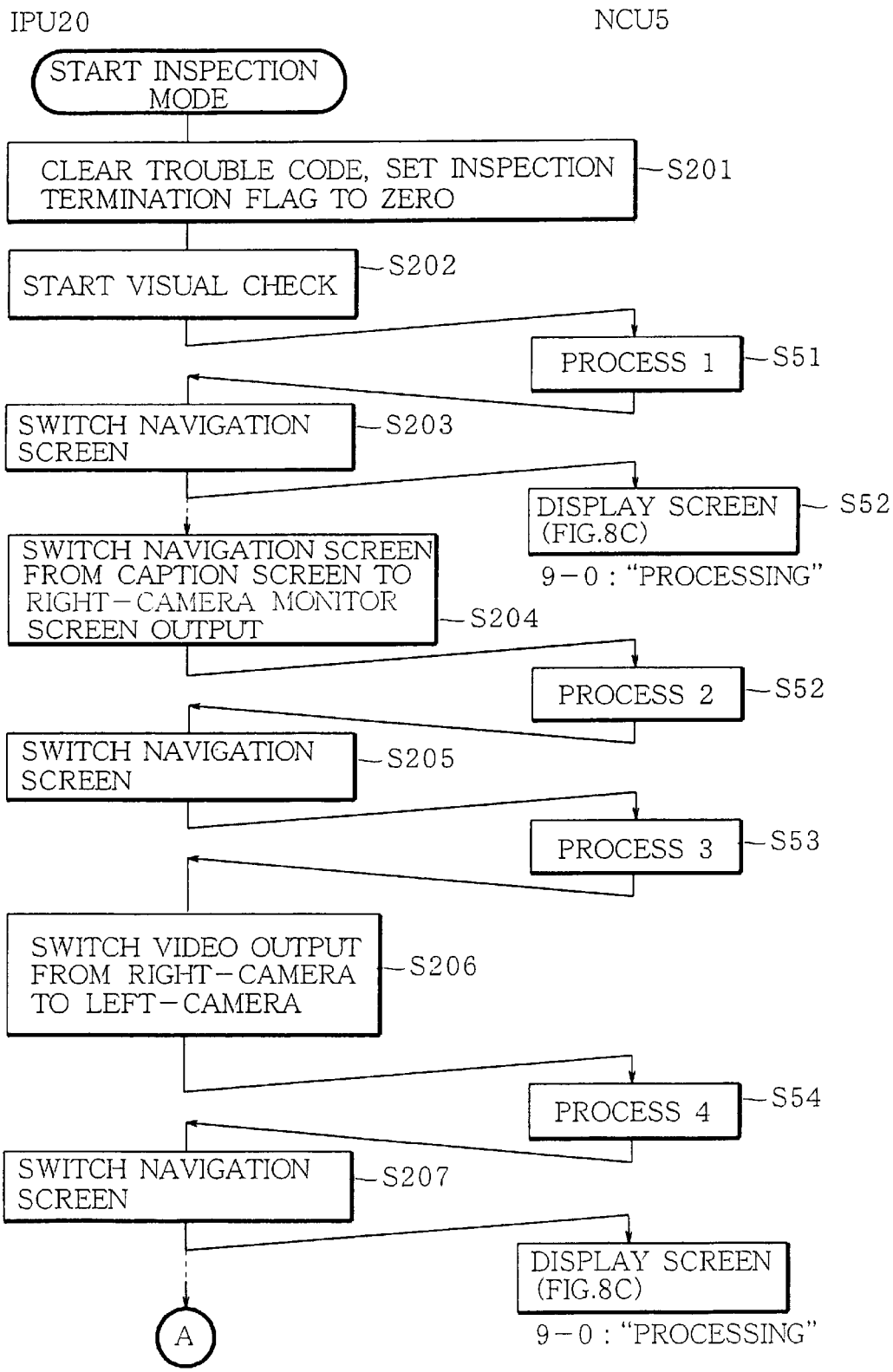
FIG. 2 is a flow chart showing an inspecting procedure for a camera by IPU and NCU.
Figure 3:
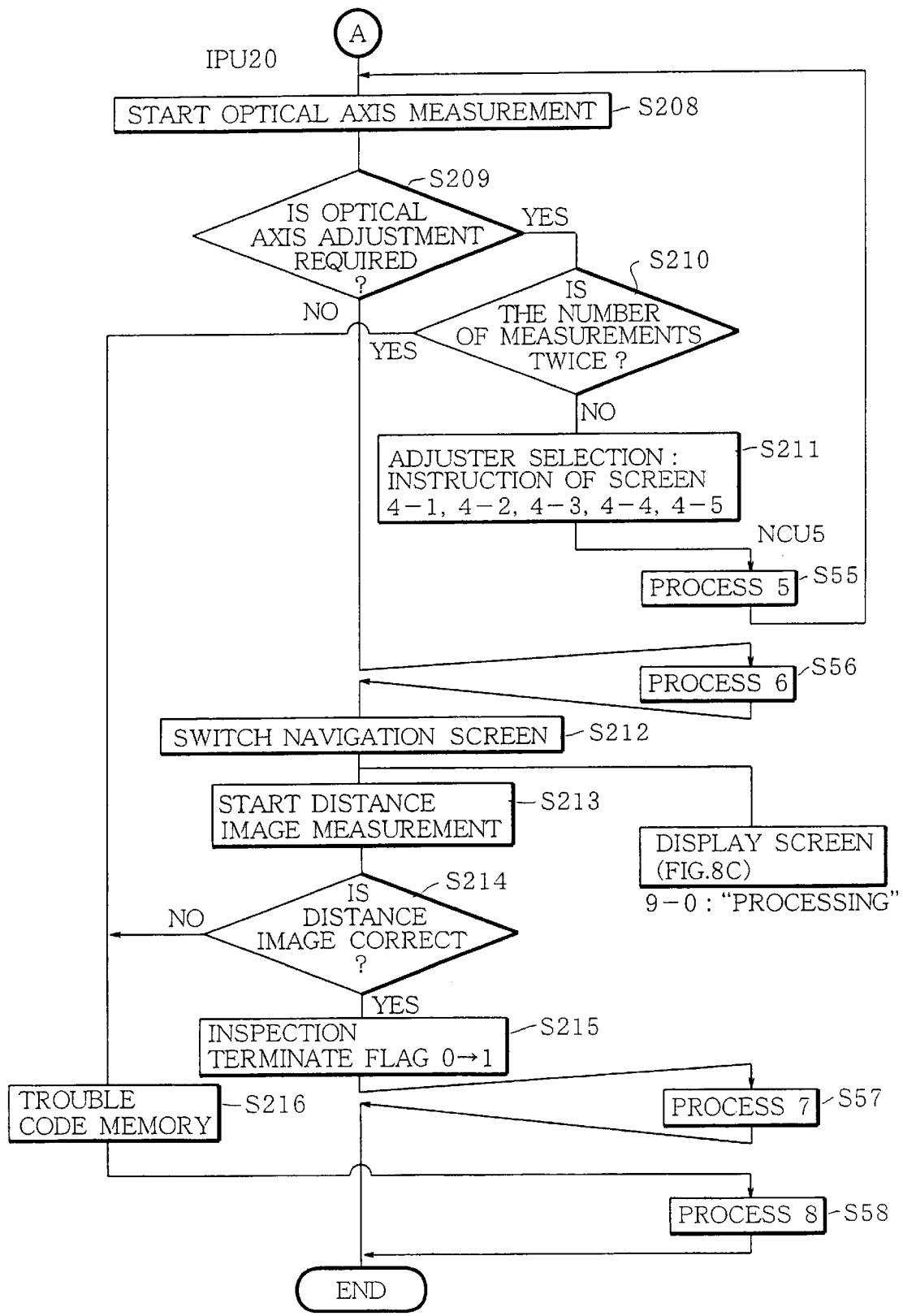
FIG. 3 is a flow chart showing an inspecting procedure for the camera by IPU and NCU, continued from the inspecting procedure of FIG. 2.
Figure 4:
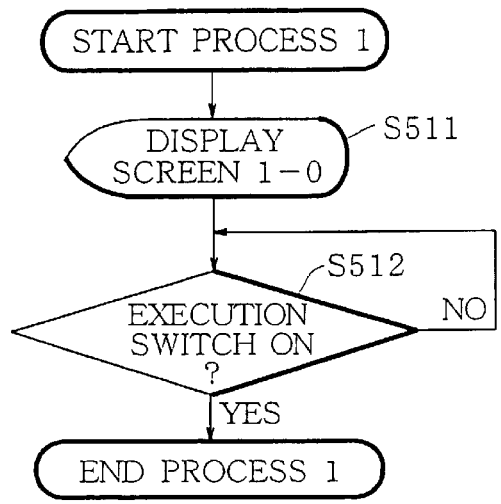
FIGS. 4A to 4D are flow charts showing respective operation procedures of NCU which are performed in the procedure of FIG. 2.
Figure 4:
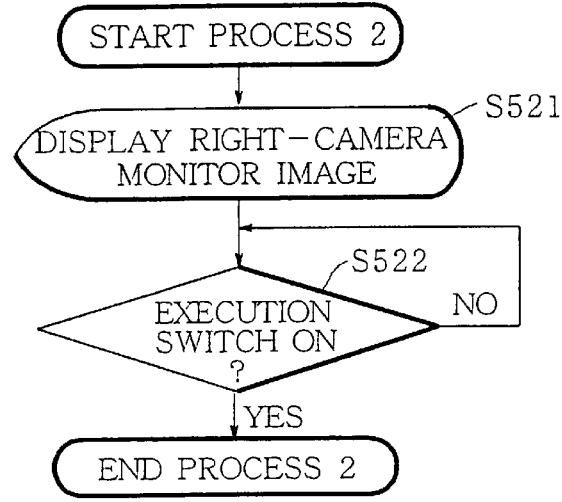
Figure 4:
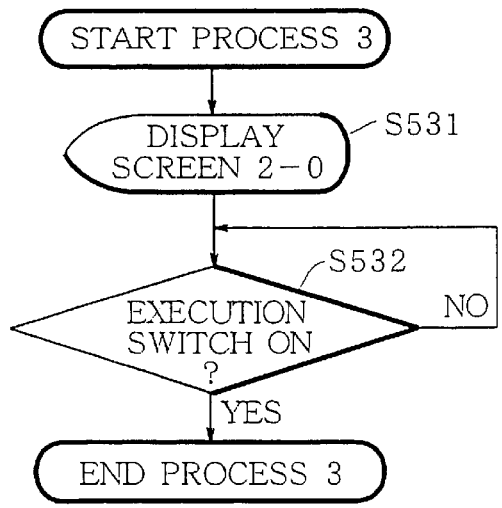
Figure 4:
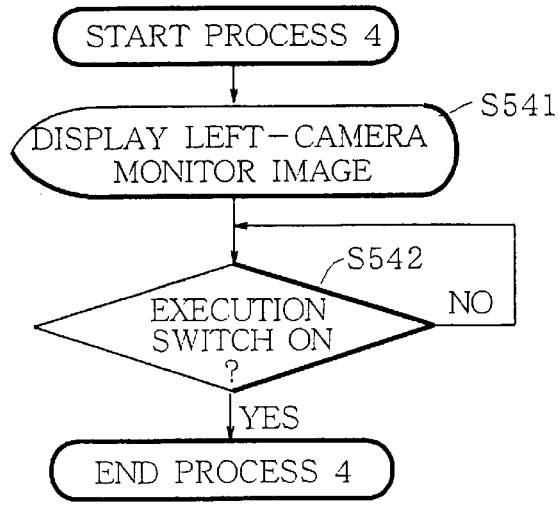
Figure 5:
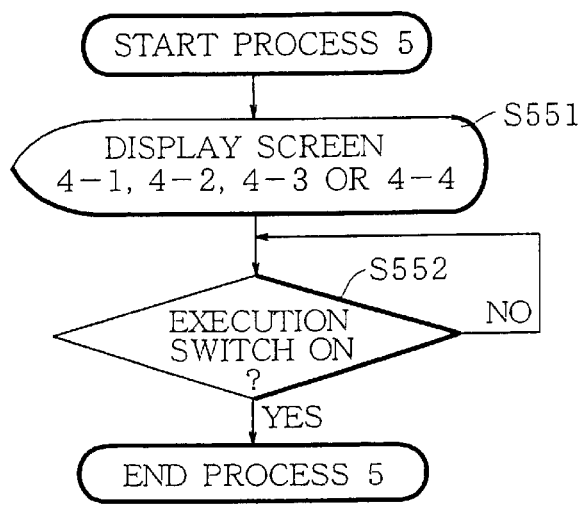
FIGS. 5A to 5D are flow charts showing respective operation procedures of NCU which are performed in the procedure of FIG. 3.
Figure 5:
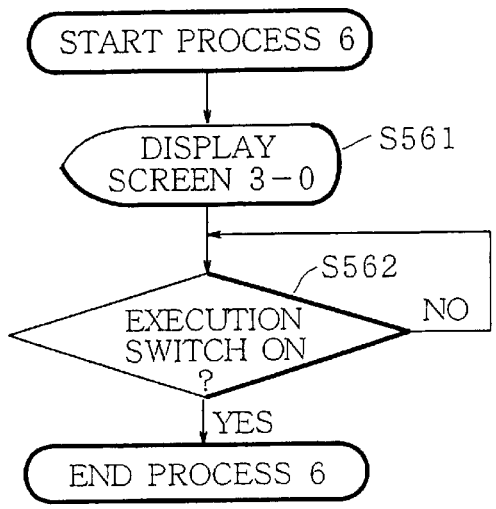
Figure 5:
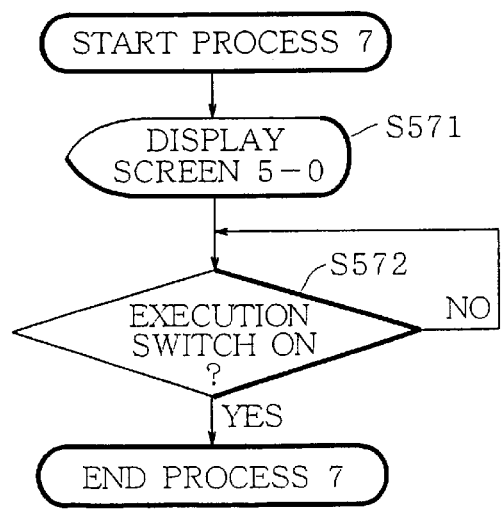
Figure 5:
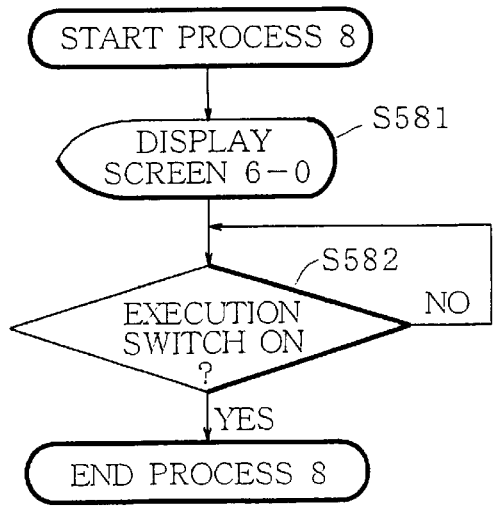
Figure 9:
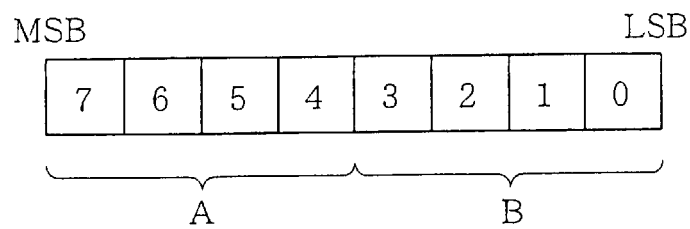
FIG. 9 is a diagram illustrating a format for data propagated through a communication cable.
Figure 10:
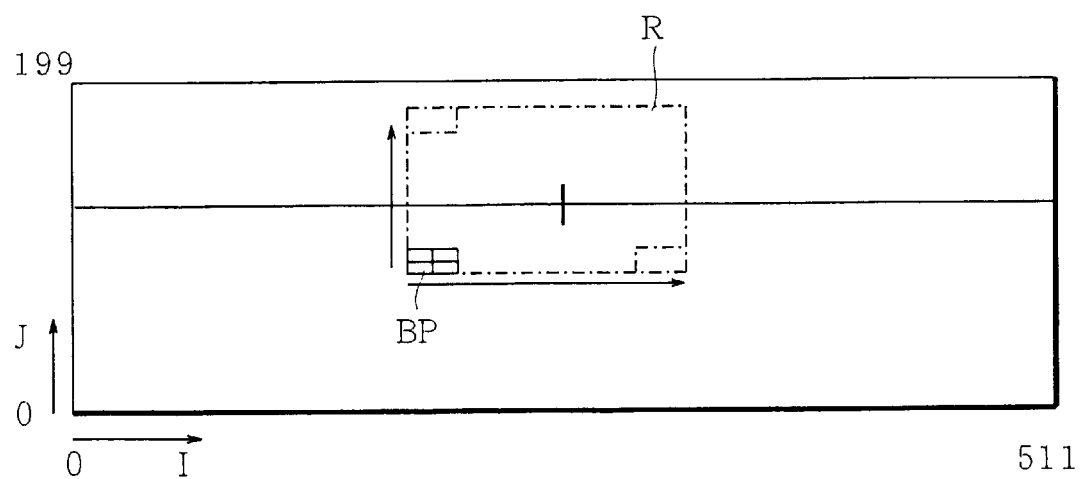
FIG. 10 is a diagram illustrating an brightness characteristic pattern and a search range of a reference image provided for the adjustment of an optical axis.

FIG. 2 to FIG. 10 are illustrations for explaining operations in the embodiment of the present invention. Concretely, FIGS. 2 and 3 are flow charts for illustrating the procedure for inspecting the camera by the IPU 20 and the NCU 5. FIGS. 4 and 5 are flow charts for illustrating the operation procedures of the NCU 5 in the procedures of FIGS. 2 and 3. FIGS. 6, 7 and 8 are diagrams illustrating screen layouts displayed on the monitor 52 of the NCU 5. FIG. 9 illustrates a format of data propagating along the communication cable 101, and FIG. 10 illustrates a pattern of brightness characteristics and a search range of the reference image provided for the adjustment of an optical axis.

Operations in the embodiment, shown in FIG. 1, according to the present invention will be next explained in detail with reference to FIG. 2 through FIG. 10.

First, an operator connects the inspection switch 6 with a connector of the IPU 20 to start of the execution of inspection mode. The quality inspection section 22 of the IPU 20 sets a trouble code memory, assigned to a built-in memory, and an inspection terminating flag to "zero" to initialize the system (step S201 in FIG. 2). As used herein, the trouble code is each code defined for a visual check, an optical axis direction and a distance measurement accuracy which will be hereinafter explained as quality inspection items. The item determined as quality deficiencies is code-set as condition information. Later, the operator will check the contents of the condition information on the monitor 52 of the NCU 5 for re-adjustment.

After terminating the above initializing process for the system, the visual check is first selected as the inspection item (step S202 in FIG. 2). The monitor 52 of the NCU 5 displays a visual check screen (screen 1-0) for the right camera as illustrated in FIG. 6A (step S511 in FIG. 4A). The visual check screen is a guide screen for showing instructions for the following process. The operator pushes the execution button 61 to switch from the visual check screen for the right camera to an image screen of the right camera. If the operator sees nothing wrong on the image of the right camera, he/she must push the execution button 61 again to switch from the image screen to a visual check screen for the left camera.

The navigation main unit 51 of NCU 5 monitors specified byte data (e.g., the most significant bit of the second byte of ID "51C") of a data packet propagating through the communication cable 103, the PCU 4 and the communication cable 101. The navigation main unit 51 refers to the bit to determine whether the execution button 61 is in ON or OFF. After the operator pushes the execution button 61 (ON), the navigation main unit 51 acknowledges the termination of the guide screen to the quality inspection section 22 of the IPU 20. In turn, the quality inspection section 22 provides to the NCU 5 an instruction for switching a screen to the navigation screen (step S203 in FIG. 2). This allows the NCU 5 to display a screen of "Processing" (screen 9-0) as shown in FIG. 8C on the monitor 52 through navigation main unit 51.

The ON/OFF of the execution button 61 is assigned to the most significant bit of the aforementioned specified byte, and the ON/OFF state is reflected as information on the bit. As illustrated in the data format of FIG. 9, the displaying of the navigation screen is defined using a specified byte (e.g., the fifth byte of ID "516") of a data packet propagating along the communication cable 101, and determined by a combination of the first half A and the latter half B of the specified byte. Specifically, in FIG. 9, when the displayed navigation screen is screen 2-0 shown in FIG. 6B, the first half A is 2 and the latter half B is 0. When the displayed navigation screen is screen 4-3 shown in FIG. 7C, the first half A is 4 and the latter half B is 3.

Next, the quality inspection section 22 of the IPU 20 provides to the NCU 5 an instruction for switching from the aforementioned caption screen "Processing") to the navigation screen for outputting the monitor image of the right camera (step S204 in FIG. 2). The NCU 5 receives the instruction and switches from the caption of the navigation screen displayed on the monitor 52 through the navigation main unit 51, to the monitor image of the right camera captured through the video line 102 (step S521 in FIG. 4B). The operator previews the camera image on the monitor 52 for the visual check, and if it is normal, he/she turns the execution button 61 ON to instruct the termination of the monitor visual check for the right camera. As in the event at the aforementioned step, the navigation main unit 51 of the NCU 5 monitors ON of the execution button 61 and verifies the ON state (step S522 in FIG. 4B). After that, the navigation main unit 51 acknowledges the termination of the visual check for the right camera on the monitor to the quality inspection section 22 of the IPU 20 via the PCU 4 and the communication cable 101.

The quality inspection section 22 of the IPU 20 which has received the acknowledgement provides an instruction for switching of the navigation screen to the NCU 5 (step S205 in FIG. 2). Upon receiving the instruction, the NCU 5 uses the navigation main unit 51 to display a visual check instruction screen (screen 2-0) for the left camera illustrated in FIG. 6B on the monitor 52 (step S531 in FIG. 4C). This screen is for instructing as follows: the operator pushes the execution button 61 to switch to an image screen of the left camera. If the operator sees nothing wrong on the image of the left camera, he/she must push the execution button 61 again to switch from the image screen to a screen for the optical axis direction as the next inspection item.

The navigation main unit 51 of the NCU monitors specified byte data (e.g., the most significant bit of the second byte of ID "51C") of data propagating through the communication cable 103, the PCU 4 and the communication cable 101. The navigation main unit 51 refers to the most significant bit of the data to determine whether the execution button 61 is turned ON or OFF. After verifying ON of the execution button 61 (step S532 in FIG. 4C), the navigation main unit 51 acknowledges the termination of the guide screen to the quality inspection section 22 of the IPU via the PCU 4 and the communication cable 101.

The quality inspection section 22 of the IPU which has received the above acknowledgment provides an instruction for switching a video output to the NCU (step S206 in FIG. 2). Upon receiving the instruction, the NCU changes the image captured from the video line 102 from the monitor image for the right camera to the monitor image for the left camera to display it on the monitor 52 (step S541 in FIG. 4D). The operator previews the image of the left camera displayed on the monitor 52 for the visual check, and if normal, he/she turns the execution button 61 ON to instruct the termination of the visual check for the left camera on the monitor.

Similar to the event at the aforementioned step, the navigation main unit 51 of the NCU monitors ON of the execution button 61 and verifies the ON state (step S542 in FIG. 4D). The navigation main unit 51 then acknowledges the termination of the visual check for the left camera on the monitor to the quality inspection section 22 of the IPU via the PCU 4 and the communication cable 101. The quality inspection section 22 which has received the acknowledgement provides an instruction for switching the navigation screen to the NCU again (step S207 in FIG. 2). Upon receiving the instruction, the NCU uses the navigation main unit 51 to display the screen of "Processing" (screen 9-0) illustrated in FIG. 8C on the monitor 52.

Next, the IPU starts the automatic measurement of the optical axis (step S208 in FIG. 3). Prior to the measurement of the optical axis direction, a test chart having a predetermined pattern is placed at a predetermined position ahead of the vehicle. Regarding the test chart, for example, a cross-shaped pattern is illustrated with black lines having a predetermined width on the white surface of the test chart, and an intersecting point of the cross is positioned at the center of the test chart. The intersecting point of the cross described on the test chart is defined as a reference pattern to provide positional reference to the imaging direction and distance of an inspected sample. Hence, it is important to locate the test chart at a predetermined position with precision.

For the automatic measurement of the optical axis, first, the IPU samples a frame of reference image including the test chart located ahead of the vehicle, and set a predetermined search range R within the reference image. The search range R is defined with a predetermined area around an ideal position for the intersecting point of the cross of the test chart on the reference image. The reference image and a predetermined brightness characteristic pattern BP are two-dimensionally matched in the search range R so as to search the position at which a position correlating with the brightness characteristic pattern BP, i.e. the cross intersecting point of the test chart, is appeared.

FIG. 10 is a diagram showing the search range R and the brightness characteristic pattern BP. The brightness characteristic pattern BP has the same brightness characteristic as that of the cross intersecting point (the reference pattern) of the test chart. The width of a low brightness area (corresponding to the black lines of the cross) of the brightness characteristic pattern BP has the same brightness characteristic as that of the cross intersecting point (the reference pattern) of the test chart which is appeared on the reference screen. The width of a low brightness area (corresponding to the black lines of the cross) of the brightness characteristic pattern BP is set to be equal to the width of the line in the test chart appeared on the reference screen.

The two-dimensional match between the reference image and the brightness characteristic pattern BP within the search range R is evaluated by calculating a city block distance CB. In other words, while the brightness characteristic pattern BP to be compared is vertically/horizontally offset for each pixel all over the search range R, a pixel at which the calculated city block distance is minimum is identified as a position of the cross intersecting point of the test chart.

Next, the IPU 20 determines whether or not a vertical coordinate of the specified cross intersecting point of the test chart falls within the predetermined range, to check necessity of adjusting the optical axis (step S209 in FIG. 3). When the cross intersecting point of the test chart is out of the predetermined range, and therefore the need to adjust the optical axis is determined, it is further determined whether or not it is the second measurement of the optical axis direction (step S210 in FIG. 3). If it is the first measurement, the selection process is done for the adjuster 30 as the attachment member. Specifically, as a result of the above inspection, the IPU 20 generates a screen for recommending the changing of the adjuster such that if the camera is orientated downward, the adjuster A or the adjuster D should be used in accordance with a degree of the orientation, and if the camera is orientated upward, the adjuster C or the adjuster E should be used in accordance with a degree of the orientation. The generated screen is outputted on the monitor 52 of the NCU (step S551 in FIG. 5A). As used herein, the adjuster B is standard. Therefore, the adjuster B is used to install the stereo camera in the manufacturing line, and the adjuster 30 may be changed when the inspection determines to need the adjustment of the optical axis. After changing the adjuster, the operator pushes the execution button 61. When the NCU verifies ON of the execution button 61 (step S552 in FIG. 5A), the IPU 20 starts re-measurement of the optical axis (step S208 in FIG. 3).

After the optical-axis re-measurement, if it is determined to need the adjustment of the optical axis, a trouble code representing defective adjustment of the optical axis is written on the memory incorporated in the quality inspection section 22 of the IPU 20 because it is the second measurement (step S216 in FIG. 3), and then an "NG" screen (screen 6-0) illustrated in FIG. 8B is displayed. When it is determined that the adjustment of the optical axis is not needed at step S209, the NCU displays an optical-axis inspection "OK" screen (screen 3-0) illustrated in FIG. 6C on the monitor 52 (step S561 in FIG. 5B), and waits until the operator pushes the execution button 61 (step S562 in FIG. 5B). Upon the operator pushing the execution button 61, the IPU 20 provides an instruction for displaying the "Processing" screen (9-0) illustrated in FIG. 8C to the monitor 52 of the NCU (step S212 in FIG. 3).

Next, the IPU 20 inspects the distance measurement accuracy (step S213 in FIG. 3). Similar to the optical axis direction, in the distance measurement accuracy, a test plate described with a random pattern is placed at a predetermined position ahead of the vehicle. The quality inspection section 22 captures the image of the test plate via the image recognition main unit 21 to compute distance until the test plate ahead of the vehicle. The quality inspection section 22 then monitors the percentage of correct distance of the multiple distance data computed, and then performs a process for showing the normal condition if the predetermined percentage of correct distance is reached. Therefore, at step S214 in FIG. 3, it is determined whether or not the captured distance image is within a normal range. If it is within the normal range, the inspection terminating flag is turned ON (step S215 in FIG. 3), and the IPU 20 allows the monitor 52 of the NCU to display a distance inspection "OK" screen (screen 5-0) illustrated in FIG. 8A. Then, the processes for all the aforementioned inspection items terminate after the operator pushes the execution button 61.

On the other hand, if the distance image is out of the normal range, as in the case of the measurement of the optical axis direction, an appropriate trouble code is written on a trouble code memory. A distance inspection "NG" screen (screen 6-0) illustrated in FIG. 8B is then displayed on the monitor 52 of the NCU (step S581 in FIG. 5D) to recommend ascertaining the trouble code and performing re-adjustment. Then, upon the operator pushing the execution button 61 (step S582 in FIG. 5D), the processes for all the inspection items terminate.

As describe above, the embodiment according to the present invention uses the monitor 52 of the NCU mounted in the vehicle to display the camera image and the inspection image. Accordingly, an extra display apparatus for the inspection is not needed and a working space is secured, so that the efficiency of inspection is further improved.

The embodiment of the present invention has described one example that the test chart illustrated with the cross pattern is used in the adjustment of the optical axis, but the test chart is not limited to the cross pattern. Any test chart having a variety of intensive patterns can be used. Also, use of the stereo camera as the preview sensor has been described by way of example, but an applicable scope of the present invention is not limited to the stereo camera. It is completely natural that the present invention can be applied to the single camera.

Accordingly, the terms and description used herein are set forth by way of illustration only and are not meant as limitations. Those skilled in the art will recognize that numerous variations are possible within the spirit and scope of the invention as defined in the following claims.

What is claimed is:

1. A method for inspecting a vehicle-mounted camera, used for a vehicle monitoring system for imaging a view ahead of a vehicle with said camera installed to a vehicle body to recognize a running condition with an image processing unit, said camera being mounted to said vehicle body with a replaceable attachment, said method comprising:

imaging an inspection chart with said camera to provide an inspection chart image, said inspection chart having a reference pattern being placed at a predetermined position ahead of the vehicle;

identifying said reference pattern in said inspection chart image;

determining whether or not it is necessary to adjust an optical axis direction of said camera on a basis of a relationship between a position of said identified reference pattern, and a predetermined correct range defined for an imaging direction of said camera;

selecting a replacement attachment member, if it is determined necessary to adjust an optical axis direction of said camera, said replacement attachment member having a shape so that said optical axis direction of said camera falls within said predetermined correct range; and displaying, by a monitor of a vehicle-mounted navigation control unit, an instruction for mounting said camera to said vehicle with said replacement member.

2. The method for inspecting a vehicle-mounted camera according to claim 1, further comprising:

imaging an inspection plate having a specific pattern and placed at a predetermined position ahead of said vehicle with said camera;

calculating a distance between said inspection plate and said camera based on an imaged inspection plate;

determining whether or not a distance measurement accuracy of said camera is correct, on a basis of a comparison between said distance and a predetermined correct distance;

displaying a determination result with a monitor of a vehicle-mounted navigation control unit.

3. A system for inspecting a vehicle-mounted camera, used for a vehicle monitoring system for imaging a view ahead of a vehicle with said camera installed to a vehicle body to recognize a running condition with an image processing unit, said camera being mounted to said vehicle body through a replaceable attachment member, said image processing unit comprising:
- an inspection-means for inspecting whether or not an installing position of said camera is correct,
- a monitor of a vehicle-mounted navigation control unit for displaying a result of an inspection by said inspection means and an instruction for an adjustment of said installing position of the camera,
- said inspection means,
- imaging an inspection chart, having a reference pattern and placed at a predetermined position ahead of said vehicle, with said camera;
- identifying a reference pattern on an imaged inspection chart having an identified reference pattern;
- determining whether or not it is necessary to adjust an optical axis direction of said camera on a basis of a relationship between a position of said identified reference pattern and a predetermined correct range defined for an imaging direction of said camera;
- selecting a replacement attachment member if determined that it is necessary to adjust said optical axis direction of the camera said replacement attachment member having a shape, so that the optical axis direction of the camera falls in said predetermined correct range; and
- displaying an instruction on said monitor for installing said replacement attachment member to the vehicle.

4. The system for inspecting the vehicle-mounted camera according to claim 3, wherein

- said image processing unit includes a recognition main unit for processing an image obtained through the camera, and a quality inspection section as said inspection means;
- said quality inspection section selects at least one of an inspection for an optical axis direction and an inspection for a distance measurement to execute a selected inspection, and
- transmits data to said vehicle-mounted navigation control unit such that said monitor displays an inspection result.

5. The system for inspecting a vehicle-mounted camera according to claim 4, further comprising a switch for sending instructions to said inspection means to start said quality inspection section, and to the vehicle-mounted navigation control unit such that the monitor displays a result.

* * * * *